United States Patent Office 3,371,422
Patented Mar. 5, 1968

3,371,422
GEAR-CHECKING INSTRUMENTS
Karl Müller, Zurich, Switzerland, assignor to Maag Gear Wheel & Machine Company, Limited, Zurich, Switzerland, a Swiss company
Filed Mar. 31, 1966, Ser. No. 539,053
Claims priority, application Germany, Apr. 6, 1965, M 64,794
7 Claims. (Cl. 33—179.5)

This invention relates to machines for testing or checking gears, of the kind comprising a rotating shaft having disposed on it measuring means which represent a tooth and which have the form of an interrupted body of revolution, the shaft rotating in a desired speed relationship to the gear wheel under test, the shaft axis being perpendicular to the tooth space being tested, the shaft axis being substantially tangential to the gear wheel being tested, the rotating gear wheel intermittently shifting the measuring means axially of the said shaft. In this kind of machine the direction of measurement extends parallel to the rotating shaft, and the machine can measure, for instance, tooth thickness and tooth width continuously but cannot provide continuous radial run-out checking in the generally accepted sense of the term. Radial run-out is the difference between the greatest and smallest relative depth attained by a measuring feeler when inserted consecutively, and radially of the gear, into all of the tooth spaces of a gear. In radial run-out measurement, the depth of penetration is determined radially, for instance, by use of a ball or back-sight which is placed consecutively in all the tooth spaces of the gear under test. Data measured on gearing perpendicularly to the tooth space and substantially tangentially of the gear under test cannot provide a simple and direct measurement of radial run-out as hereinbefore defined, and conversion formulae must be used.

The object of the invention is to provide improvements in machines for checking gears whereby a direct measurement may be made of radial run-out, as the term is generally understood.

According to this invention, a machine for checking gears for radial run-out comprises a machine frame, a rotatable shaft, measuring means mounted on the shaft for rotation therewith, the said measuring means having the form of an interrupted body of revolution and representing a gear tooth adapted to enter a tooth space of a gear wheel which is to be tested, a holder in which the said shaft is mounted with the axis of the shaft perpendicular to the axis of the holder, the holder being mounted on the machine frame for the measuring means carried by the holder to be reciprocable perpendicularly of the axis of the holder and to be resiliently movable perpendicularly of the said shaft, and means for indicating and recording the said movement of the measuring means perpendicularly of the said shaft.

One form of checking machine according to this invention is shown diagrammatically in the accompanying drawings, wherein.

Figure 1:
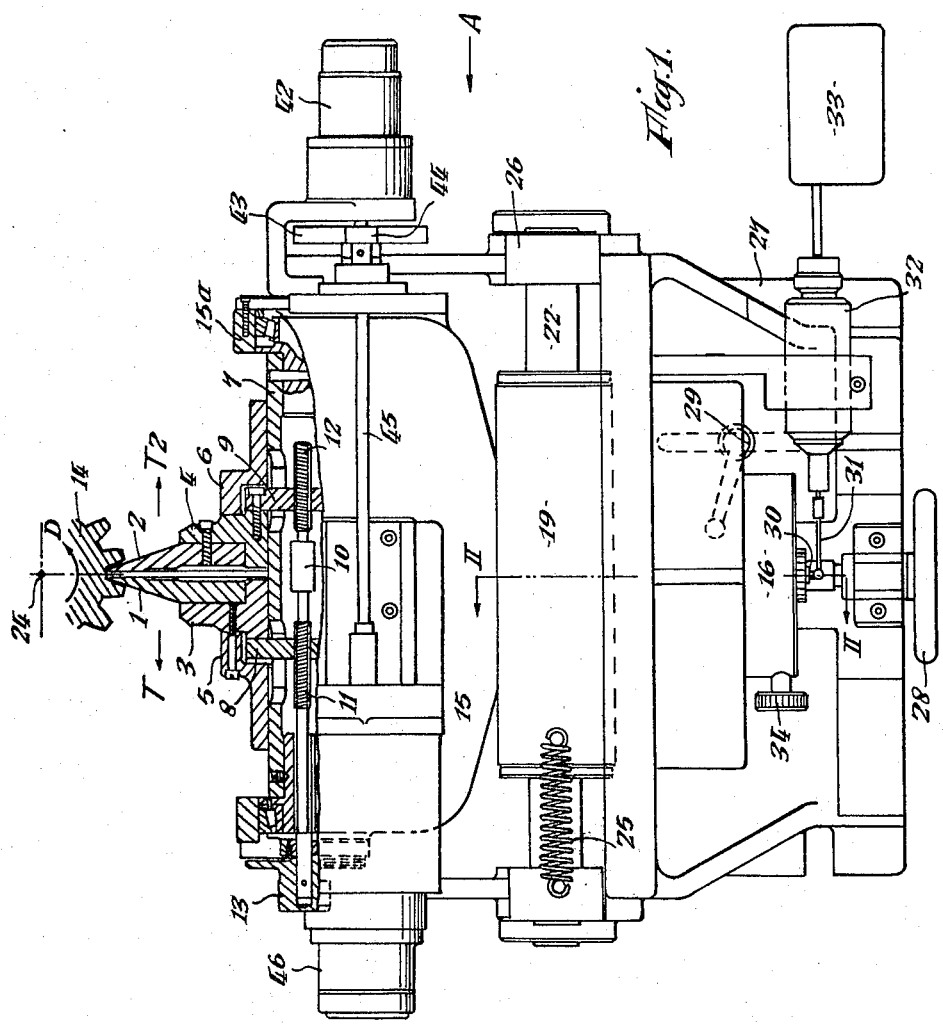
FIG. 1 is a plan view, a part thereof being in section on the line I—I of FIG. 2.
Figure 2:
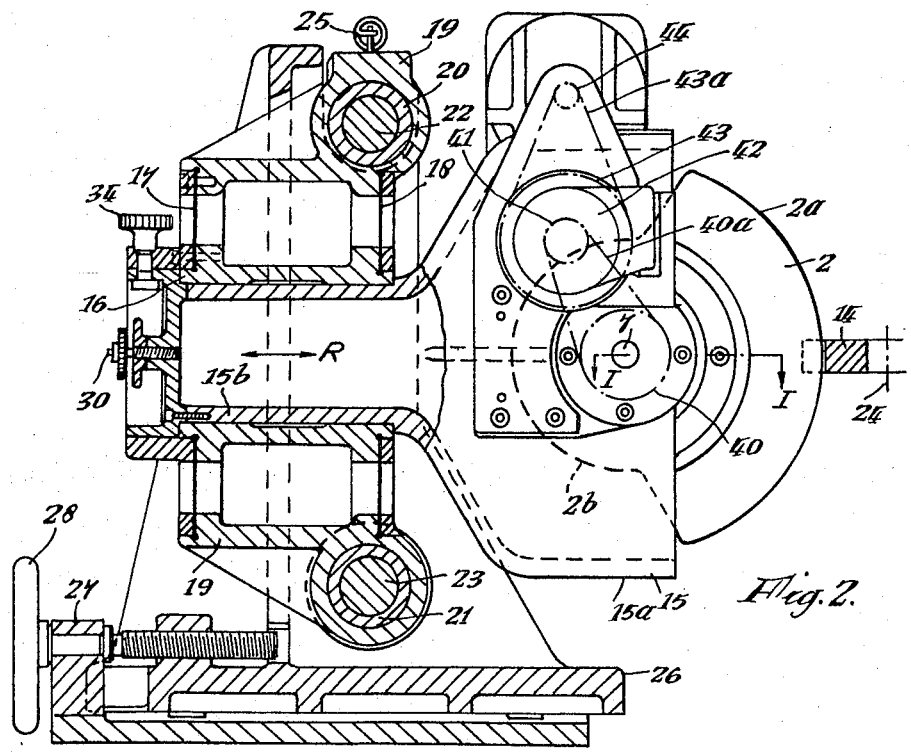
FIG. 2 is a side elevation, looking in the direction of the arrow A in FIG. 1, a part thereof being in section on the line II—II in FIG. 1.

A measuring means, comprising two measuring jaws 1, 2 secured, respectively, to flanges 3, 4 on guide bushes 5, 6, is disposed for axial movement on and rotation with a rotary shaft 7. The two flanges 3, 4 are interconnected by cross members 8, 9 and a screw-threaded spindle 10; the spindle 10 has screw-threaded portions 11, 12 of opposite hands, which respectively engage the cross members 8, 9, so that when the spindle 10 is rotated, by means of an operating knob 13, the two jaws 1, 2 are moved relatively to one another, and axially on the shaft 7, to adjust the measuring means to a width to suit the tooth space width of a gear wheel 14 which is to be tested. The two jaws 1, 2 are interrupted bodies of revolution, that is, they have the shape shown in FIG. 2, for the jaw 2, which provides a larger radius operative portion 2a (which has the transverse shape shown in FIG. 1) and a smaller radius inoperative portion 2b.

The shaft 7 is mounted in and across the head 15a of a holder 15 which has a shank 15b mounted rotatably in a block 16. The axis of the holder 15 and of its shank 15b is perpendicular to and intersects the axis of the shaft 7, and also passes medially between the two measuring jaws 1 and 2.

The block 16 is mounted in a slide 19 by means of axially resilient diaphragms 17, 18 so as to be axially movable and to have very little friction, the axial mobility being in the directions indicated by the arrows R, that is, perpendicular to the axis of the shaft 7. The slide 19 is mounted, by means of bearing bushes 20, 21 secured in it, on two guide rods 22, 23 so as to be movable perpendicularly to the axis of the holder 15 and parallel to the medial and normal attitude, hereinafter defined, of the axis of the shaft 7. The two guide rods 22, 23 are mounted in a cross-slide 26. A tension spring 25, anchored by one end to the slide 19 and by its other to the cross-slide 26, continuously biases the slide 19 to move in the direction indicated by the arrow T in FIG. 1. The cross-slide 26 can be moved, by means of a handwheel 28, on the baseplate 27 of the machine perpendicularly to the axis of the shaft 7, and parallel to the axis of the holder 15, that is, in the directions of the arrows R, and can be clamped in the desired position by means of a clamp 29.

Disposed on the holder 15 is a screw-threaded pin 30 which can be adjusted axially thereof, that is, in the directions indicated by the arrows R, and which is connected to a feeler 31 of a device 32 for measuring movements of the holder 15 in the directions R. The device 32 is connected to a recorder 33 which provides a graphic recording of the deflections of the feeler 31.

The shaft 7 is driven by a wheel 40 which is in engagement, through a drive transmission element 40a, with a pinion 41 secured to the shaft of an inductive synchro receiver or motor 42. Also secured to the shaft of the synchro motor 42 is a wheel 43 which is engaged, through a drive transmission element 43a, with a wheel 44 which is secured on the shaft 45 of a servomotor 46. The synchro motor 42 and the servomotor 46 are secured to the holder 15.

Figure 3:
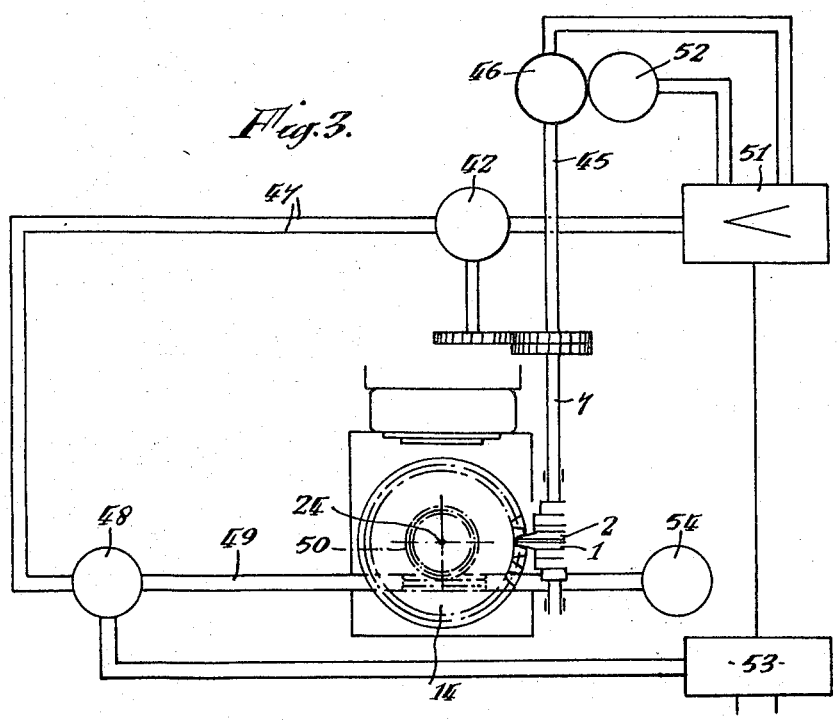
FIG. 3 is a diagram of a synchro system incorporated with the gear checking machine.

The inductive synchro motor 42 is electrically connected by means 47 (FIG. 3) to an inductive synchro sender or generator 48 which drives the gear wheel 14, which is to be tested, by way of a worm shaft 49 and worm wheel 50. Any lack of synchronisation between the synchro motor 42 and the synchro generator 48 originates an error signal which, through the agency of an electronic amplifier 51, rotates the servomotor 46 positively or negatively until the set value has been restored. A tachometer generator 52 is provided, as well as the servo motor 46, to ensure that the shaft 7 runs stably and without vibration; the tachometer generator output is fed back negatively to the amplifier 51 to provide electrical stabilisation of the control loop. Conveniently, a mains power pack 53 is provided for the synchro system 42, 47, 48.

The gear wheel 14, which is to be tested or checked for radial run-out, is mounted on the machine with its axis 24 perpendicular to the axis of the shaft 7, when the shaft 7 is in its normal and medial attitude as hereinafter defined, and substantially perpendicular to the axis of the holder 15, and with the axis of the holder 15 in a plane between, and preferably medially between, the axial end faces of the gear wheel 14. The rotary drive to the gear wheel 14 and to the shaft 7 are in the ratio of one to the number of teeth on the gear wheel 14, that is, if the gear wheel 14 has $z$ teeth, the shaft 7 rotates $z$ times faster than the gear wheel 14. When the gear wheel 14 is a helical or spiral gear the holder 15 is rotated in the block so that the measuring jaws 1 and 2 are inclined to correspond with the inclination of the teeth of the gear wheel 14. When the gear wheel 14 has straight teeth the holder 15 will be rotated in the block 16 until the axis of the shaft 7 also is perpendicular to the axis 24 of the gear wheel 14 and also is in the said plane between the axial end faces of the gear wheel 14; this latter attitude of the axis of the shaft 7 is the normal and medial attitude hereinbefore referred to. The holder 15 is locked in the block 16, in the desired position to which it is adjusted by rotation in the block, by a nut and bolt 34. The two measuring jaws 1, 2 have their axial separation adjusted, by means of the spindle 10, in accordance with tooth space width of the gear wheel 14, and are lightly pressed by the diaphragms 17, 18 into the tooth space lying opposite them. The gear wheel 14 is rotated in the direction D, FIG. 1, and moves the two jaws 1, 2, which together form one tooth of an ideal tooth rack, tangentially of the gear wheel 14 in the direction of the arrow T2, and, in so doing, moves the slide 19 in the direction against the force of its biasing spring 25. The depth of pentration of the two discs 1, 2 into the tooth space in the direction of the axis of the holder 15, indicated by the arrows R, is sensed by the feeler 31, measured by the measuring device 32, and recorded by the recording device 33. After the measurement zone has been passed through, that is, as the jaws 1, 2 continue to rotate with the shaft 7, the interrupted portions (2b) thereof come adjacent to, but not in engagement with, the gear wheel 14, the spring 25 then returning the slide 19 in the direction of the arrow T. As the gear wheel 14 and the jaws 1, 2 continue to rotate, the larger radius portions (2a) of the jaws 1, 2 engage in the next tooth space of the gear wheel 14, whereafter measurement of the said next tooth space begins, and this process continues successively until all the tooth spaces of the gear wheel 14 have been continuously measured or recorded.

During measurement, the measuring means, that is, the two jaws 1, 2, are intermittently moved axially together with the slide 19. Maximum measurement deflections along the axis of the gear wheel under test are particularly important for assessing radial run-out, and so it is sufficient for these maximum deflections to be emphasised in the recording.

The two jaws 1, 2 can be changed for other jaws to suit a wide range of sizes of teeth and engagement angles of the gearing to be tested.

As well as being used as a separate device, the machine according to the invention can be disposed on a gear-cutting machine; conveniently, in this event, the synchro generator 48 of the gear-testing machine is either disposed on the same shaft as the driving motor 54 (FIG. 3) of the gear-cutting machine, or is connected to such motor by a suitable drive means. Conveniently too, the clamping means of the gear checking machine may be provided by the clamping table of the gear-cutting machine.

The drawings show a straight tooth gear wheel under test, but the machine according to the invention can be used to test helical gears or any articles having either tooth systems or teeth resembling tooth systems.

What I claim and desire to secure by Letters Patent is:

1. A machine for checking gears for radial run-out, comprising a machine frame, a rotatable shaft, measuring means mounted on the shaft for rotation therewith, the said measuring means having the form of an interrupted body of revolution and representing a gear tooth adapted to enter a tooth space of a gear wheel which is to be tested, a holder in which the said shaft is mounted with the axis of the shaft perpendicular to the axis of the holder, the holder being mounted on the machine frame for reciprocation perpendicular to the axis of the holder and for resilient movement perpendicular to the axis of said shaft, and means for indicating and recording the said movement of the measuring means perpendicular to said shaft.

2. A machine according to claim 1, further comprising a slide on which the said holder is mounted, the said slide being reciprocable on the machine frame perpendicularly of the axis of the holder, spring means biasing the slide to move in one direction of said reciprocable movement, and a resilient mounting between the holder and the said slide to allow movement of the said measuring means perpendicularly of the said shaft.

3. A machine according to claim 2, wherein the said resilient mounting between the holder and the slide comprises at least one diaphragm which is resilient axially of the holder.

4. A machine according to claim 1, further comprising drive means for rotating the said shaft and a gear wheel which is to be tested, and a synchro system for interconnecting the drive means of the said shaft and of the said gear wheel.

5. A machine according to claim 4, wherein the said synchro system includes a synchro generator which is connectable to the driving motor of a gear-cutting machine.

6. A machine according to claim 1, wherein the said measuring means comprises two measuring jaws which are adjustable relatively to each other and axially thereof to suit the tooth space width of a gear wheel which is to be tested.

7. A method of checking gears for radial run-out with a machine comprising a machine frame, a rotatable shaft, measuring means mounted on the shaft for rotation therewith, the said measuring means having the form of an interrupted body of revolution and representing a gear tooth adapted to enter a tooth space of a gear wheel which is to be tested, a holder in which the said shaft is mounted with the axis of the shaft perpendicular to the holder, the holder being mounted on the machine frame for reciprocation perpendicular to the axis of the holder and for resilient movement perpendicular to said shaft, and means for indicating and recording the said movement of the measuring means perpendicular to said shaft, comprising mounting a gear wheel, which is to be tested, on the said machine with a tooth space thereof perpendicular to the axis of the said shaft and with the axis of the said shaft substantially tangential to the said gear wheel, causing the said measuring means to pentrate the said tooth space to the maximum extent, rotating the said shaft and the said gear wheel simultaneously at a speed ratio of one revolution of the gear wheel to a number of revolutions of the shaft equal to the number of teeth on the gear wheel, the direction of rotation of the gear wheel being such as to move the measuring means substantially tangentially of the gear wheel in one of the directions of said reciprocable movement, and successively recording the extent of penetration of the measuring means into the successive tooth spaces of the gear wheel.

No references cited.

SAMUEL S. MATTHEWS, *Primary Examiner.*